US008516578B1

(12) United States Patent
Tavares

(10) Patent No.: US 8,516,578 B1
(45) Date of Patent: Aug. 20, 2013

(54) VERTEX ARRAY ACCESS BOUNDS CHECKING

(75) Inventor: Greggory Alan Tavares, San Francisco, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 12/975,957

(22) Filed: Dec. 22, 2010

(51) Int. Cl.
*G06F 11/00* (2006.01)

(52) U.S. Cl.
USPC .............................. 726/22; 345/1.3; 345/440

(58) Field of Classification Search
USPC ..................................... 726/22; 345/1.3, 440
See application file for complete search history.

(56) References Cited

U.S. PATENT DOCUMENTS

| 2007/0257924 | A1* | 11/2007 | Quarre et al. ................. 345/522 |
| 2008/0042923 | A1* | 2/2008 | De Laet ......................... 345/1.3 |
| 2008/0141131 | A1 | 6/2008 | Cerny et al. |
| 2008/0211827 | A1 | 9/2008 | Donovan et al. |
| 2009/0231332 | A1 | 9/2009 | Woo et al. |
| 2011/0242119 | A1 | 10/2011 | Bolz et al. |

OTHER PUBLICATIONS

Lee, Hwanyong, and Nakhoon Baek, "Implementing OpenGL ES on OpenGL." Consumer Electronics, 2009. ISCE'09. IEEE 13th International Symposium on. IEEE, 2009.
Pulli, Kari "New APIs for mobile graphics." Proc. SPIE Electronic Imaging: Multimedia on Mobile Devices II 6074 (2006): 1-13.
Hung, Chih-Yang. "OpenGL ES-based Emulator with Performance Tuning in the 3DApplication Development Platform for Embedded Systems." (2009).
"glActiveTexture-select active texture unit" [online], copyrght 1991-2006, http://www.khronos.org/opengles/sdk/docs/man/xhtml/glActiveTexture.xml, 1 page.
"glBind Texture-bind a named texture to a texturing target", [online], copyright 1991-2006, http://www.khronos.org/opengles/sdk/docs/man/xhtml/glBindTexture.xml, 2 pages.
"glGenTextures-generate texture names", [online], copyright 1991-2006, http://www.khronos.org/opengles/sdk/docs/man/xhtml/glGenTextures.xml, 2 pages.
"glDeleteTextures-delete named textures", [online], copyright 1991-2006, http://www.khronos.org/opengles/sdk/docs/man/xhtml/glDeleteTextures.xml, 2 pages.

(Continued)

*Primary Examiner* — April Y Blair
(74) *Attorney, Agent, or Firm* — Lerner, David, Littenberg, Krumholz & Mentlik, LLP

(57) ABSTRACT

Aspects of the invention relate generally to validating array bounds in an API emulator. More specifically, an OpenGL (or OpenGL ES) emulator may examine each array accessed by a 3D graphic program. If the program requests information outside of an array, the emulator may return an error when the graphic is drawn. However, when the user (here, a programmer) queries the value of the array, the correct value (or the value provided by the programmer) may be returned. In another example, the emulator may examine index buffers which contain the indices of the elements on the other arrays to access. If the program requests a value which is not within the range, the emulator may return an error when the graphic is drawn. Again, when the programmer queries the value of the array, the correct value (or the value provided by the programmer) may be returned.

12 Claims, 13 Drawing Sheets

(56) References Cited

OTHER PUBLICATIONS

"glCopyTexImage2D-copy pixels into a 2D texture image", [online], copyright 1991-2006, http://www.khronos.org/opengles/sdk/docs/man/xhtml/glCopyTexImage2D.xml, 3 pages.
"glCompressedTexImage2D-specify a two-dimensional texture image in a compressed format", [online], copyright 1991-2006, http://www.khronos.org/opengles/sdk/docs/man/xhtml/glCompressedTexImage2D.xml, 3 pages.
"glLinkProgram-link a program object" [online], copyright 2003-2005, http://www.khronos.org/opoengles/sdk/docs/man/xhtml/glLinkProgram.xml, 3 pages.
"glTexImage2D-specify a two-dimensional texture image", [online], copyright 1991-2006, http://www.khronos.org/opengles/sdk/docs/man/xhtml/glTexImage2D.xml, 4 pages.
"glTexParameter-set texture parameters", [online], copyright 1991-2006, http://www.khronos.org/opengles/sdk/docs/man/xhtml/glTexParameter.xml, 5 pages.
"glUseProgram-install a program object as part of current rendering state", [online], copyright 2003-2005, http://www.khronos.org/opengles/sdk/docs/man/xhtml/glUseProgram.xml, 2 pages.
"glUniform-specify the value of a uniform variable for the current program object" [online], Copyright 2003-2005, http://www.khronos.org/opengles/sdk/docs/man/xhtml/glUniform.xml, 6 pages.
"glGetVertexAttrib-return a generic vertex attribute parameter", [online], copyright 2003-2005, http://www.khronos.org/opengles/sdk/docs/man/xhtml/glGetVertexAttrib.xml, 3 pages.
"glGetVertexAttribPointerv-return the address of the specified generic vertex attribute pointer", [online], copyright 2003-2005, http://www.khronos.org/opengles/sdk/docs/man/xhtml/glGetVertexAttribPointerv.xml, 2 pages.
"glVertexAttrib-specify the value of a generic vertix attribute", [online], copyright 2003-2005, http://www.khronos.org/opengles/sdk/docs/man/xhtml/glVertexAttrib.xml, 3 pages.
"glEnableVertexAttribArray-enable or disable a generic vertex attribute array", [online], copyright 2003-2005, http://www.khronos.org/opengles/sdk/docs/man/xhtml/glEnableVertexAttribArray.xml, 2 pages.
"glDrawArrays-render primitives from array data", [online], copyright 1991-2006, http://www.khronos.org/opengles/sdk/docs/man/xhtml/glDrawArrays.xml, 2 pages.
"glDrawElements-render primitives from array data", [online], copyright 1991-2006, http://www.khronos.org/opengles/sdk/docs/man/xhtml/glDrawElements.xml, 2 pages.
"man page VertexAttribPointer—define an array of generic vertex attribute data" [online]. [Retrieved Feb. 9, 2011] http://www.khronos.org/opengles/sdk/docs/man/xhtml/glVertexAttribPointer.xml, 3 pages.
"man page glUseProgram—install a program object as part of current rendering state" [online] [Retrieved Feb. 9, 2011] Retrieved from the internet: http://www.khronos.org/opengles/sdk/docs/man/xhtml/glUseProgram.xml, 2 pages.
"man page glLinkProgram—link a program object" [online]. [Retrieved Feb. 9, 2011]. Retrieved from the internet: http://www.khronos.org/opengles/sdk/docs/man/xhtml/glLinkProgram.xml, 3 pages.
"man page glGenBuffers—generate buffer object names" [online]. [Retrieved Feb. 9, 2011]. Retrieved from the internet: http://www.khronos.org/opengles/sdk/docs/man/xhtml/glGenBuffers.xml, 2 pages.
"man page glEnableVertexAttribArray—enable or disable a generic vertex attribute array" [online]. [Retrieved Feb. 9, 2011]. Retrieved from the internet: http://www.khronos.org/opengles/sdk/docs/man/xhtml/glEnableVertexAttribArray.xml, 2 pages.
"man page glDrawArrays—render primitives from array data" [online]. [Retrieved Feb. 9, 2011]. Retrieved from the internet: http://www.khronos.org/opengles/sdk/docs/man/xhtml/glDrawElements.xml, 2 pages.
"man page glDrawElements—render primitives from array data" [online]. [Retrieved Feb. 9, 2011] Retrieved from the internet: http://www.khronos.org/opengles/sdk/docs/man/xhtml/glDrawArrays.xml, 2 pages.
"man page glDelet3eBuffers—delete named buffer objects" [online]. {Retrieved Feb. 9, 2011]. Retrieved from the internet: http://www.khronos.org/opengles/sdk/docs/man/xhtml/glDeleteBuffers.xml, 1 page.
"man page glBufferSubData—update a subset of a buffer object's data store" [online]. [Retrieved Feb. 9, 2011]. Retrieved from the internet: http://www.khronos.org/opengles/sdk/docs/man/xhtml/glBufferSubData.xml, 2 pages.
"man page glBufferData—create and initialize a buffer object's data store" [online]. [Retrieved Feb. 9, 2011]. Retrieved from the internet: http://www.khronos.org/opengles/sdk/docs/man/xhtml/glBufferData.xml, 3 pages.
"man page glBindBuffer—bind a named buffer object" [online]. [Retrieved Feb. 9, 2011]. Retrieved from the internet: http://www.khronos.org/opengles/sdk/docs/man/xhtml/glBindBuffer.xml, 2 pages.
"log of/trunk/src/gpu/command_buffer/service/shader_manager.cc" [online]. [Retrieved Feb. 9, 2011]. Retrieved from the internet: http://src.chromium.org/viewvc/chrome/trunk/src/gpu/command_buffer/service/shader_manager.cc?view=log, 3 pages.
log of/trunk/src/gpu/command_buffer/service/shader_manager.h [online]. [Retrieved Feb. 9, 2011]. Retrieved from the internet: http://src.chromium.org/viewvc/chrome/trunk/src/gpu/command_buffer/service/shader_manager.h?view=log, 5 pages.
log of/trunk/src/gpu/command_buffer/service/program_manager.cc [online]. [Retrieved Feb. 9, 2011]. Retrieved from the internet: http://src.chromium.org/viewvc/chrome/trunk/src/gpu/command_buffer/service/program_manager.cc?view=log, 7 pages.
"log of/trunk/src/gpu/command_buffer/service/program_manager.h" [online]. [Retrieved Feb. 9, 2011]. Retrieved from the internet: http://src.chromium.org/viewvc/chrome/trunk/src/gpu/command_buffer/service/program_manager.cc?view=log, 6 pages.
"log of/trunk/src/gpu/command_buffer/service/buffer" [online] [Retrieved Feb. 9, 2011]. Retrieved from the internet: http://src.chromium.org/viewvc/chrome/trunk/src/gpu/command_buffer/service/buffer_manager.cc?view=log, 6 pages.
"log of/trunk/src/gpu/command_buffer/service/buffer_manager.h" [onlne]. [Retrieved Feb. 9, 2011]. [Retrieved from internet: http://src.chromium.org/viewvc/chrome/trunk/src/gpu/command_buffer/service/program_manager.h?view=log, 6 pages.
"view of/trunk/src/gpu/command_buffer/service/gles2_cmd_decoder_autogen.h" [online]. [Retrieved Feb. 9, 2011]. Retrieved from the internet: http://src.chromium.org/viewvc/chrome/trunk/src/gpu/command_buffer/service/gles2_cmd_decoder_autogen.h?view=markup, 46 pages.
"view of trunk/src/gpu/command_buffer/service/gles2_cmd_decoder.cc" [online]. [Retrieved Feb. 9, 2011]. Retrieved from the internet: http://src.chromium.org/viewvc/chrome/trunk/src/gpu/command_buffer/service/gles2_cmd_decoder.cc?view=markup, 104 pages.
"view of/trunk/src/gpu/command_buffer/client/gles2_cmd_helper.cc" [online]. [Retrieved Feb. 9, 2011]. Retrieved from the internet: http://src.chromium.org/viewvc/chrome/trunk/src/gpu/command_buffer/client/gles2_cmd_helper.cc?view=markup, 1 page.
"view of/trunk/src/gpu/command_buffer/client/gles2_cmd_helper.h" [online]. [Retrieved Feb. 9, 2011]. Retrieved from the internet: http://src.chromium.org/viewvc/chrome/trunk/src/gpu/command_buffer/client/gles2_cmd_helper.h?view=markup, 3 pages.
"view of/trunk/src/gpu/command_buffer/client/gles2_implementation.cc" [online]. [Retrieved Feb. 9, 2011]. Retrieved from the internet: http://src.chromium.org/viewvc/chrome/trunk/src/gpu/command_buffer/client/gles2_implementation.cc?view=markup, 29 pages.
"log of/trunk/src/gpu/command_buffer/client/gles2_implementation_autogen.h" [online]. [Retrieved Feb. 9, 2011]. Retrieved from the internet: http://src.chromium.org/viewvc/chrome/trunk/src/gpu/command_buffer/client/gles2_implementation_autogen.h?view=markup, 16 pages.

"log of trunk/src/gpu/commpand_buffer/client/gles2_implementation.h" [online]. [Retrieved Feb. 9, 2011]/ Retrieved from the internet: http://src.chromium.org/viewvc/chrome/trunk/src/gpu/command_buffer/client/gles2_implementation.h?view=markup, 7 pages.

"log of trunk/src/gpu/command_buffer/client/gles2_c_lib_autogen.h" [online]. [Retrieved Feb. 9, 2011]. Retrieved from the internet: http://src.chromium.org/viewvc/chrome/trunk/src/gpu/command_buffer/client/gles2_c_lib_autogen.h?view=markup, 16 pages.

* cited by examiner

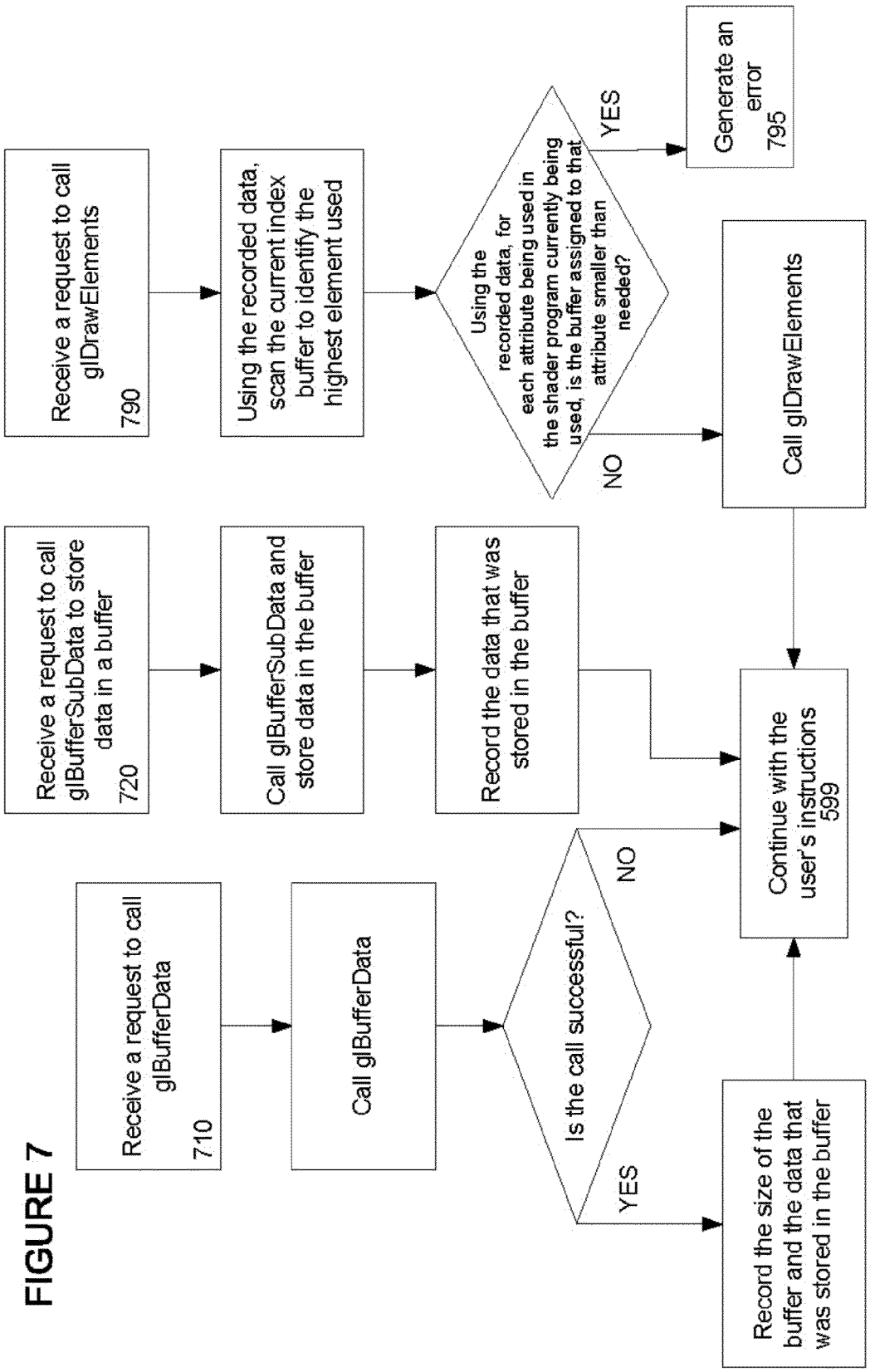

VERTEX ARRAY ACCESS BOUNDS CHECKING

BACKGROUND OF THE INVENTION

Graphics application programming interfaces ("API") are used by programmers to create 2D and 3D graphics. The Open Graphics Library ("Open GL") is a widely used API. The Open GL architecture allows programmers to produce consistent visual display results on any OpenGL API-compliant hardware regardless of the operating system. OpenGL for embedded systems ("OpenGL ES") is a subset of the OpenGL API designed for embedded devices such as mobile phones, PDAs, and video game consoles.

Many malicious programs, for example spyware or viruses, may access a user's personal information, such as credit card numbers or passwords, and send this information to be used unlawfully by third parties. These malware programs typically begin their destructive behaviors after a user has taken some action, for example, selecting a link on a website or opening a malicious email.

However, in some situations, the user need not take any affirmative action in order to leave the user's computer open to security threats. For example, a programmer may also take advantage of a user's personal information by using OpenGL (or ES) to read information on the user's computer. In this case, the user may have several tabs open in a browser window. In a first tab, the user may access personal account information, for example, a bank account. In another tab, the user may be researching information about a particular topic. The user may select a web page which is generally innocuous, for example, a news site including one or more 3D graphics. The user's computer may download and display various types of information including text and 3D graphics. The graphics information is received by the user's computer and translated from the OpenGL language to an image by instructing the computer to take certain actions. For example, the programmer's instructions may require the computer to access memory outside of the confines of graphics data. In some examples, the programmer may even have access to the user's account information on another tab in the web browser. Once an outside party has access to the user's information, the user no longer has control over it. These types of security breaches may be accidental or purposeful on the part of the programmer, but may still be dangerous to users.

BRIEF SUMMARY OF THE INVENTION

Aspects of the invention relate generally to validating array bounds in an API emulator. More specifically, an OpenGL (or OpenGL ES) emulator may examine each array accessed by a 3D graphic program. If the program requests information outside of an array, the emulator may return an error when the graphic is drawn. However, when the user (here, a programmer) queries the value of the array, the correct value (or the value provided by the programmer) may be returned. In another example, the emulator may examine index buffers which contain the indices of the elements on the other arrays to access. If the program requests a value which is not within the range, the emulator may return an error when the graphic is drawn. Again, when the programmer queries the value of the array, the correct value (or the value provided by the programmer) may be returned.

One aspect of the invention provides a computer-implemented method of validating an attempt to draw an image using a graphics library including functions and elements. The method includes receiving a request from a user to use a first function to draw the image; identifying, by a processor, a set of code to draw the image, the set of code being associated with a set of inputs; identifying one or more buffers that have been created; identifying a given buffer of the one or more buffers based on the set of inputs; identifying the size of the given buffer; retrieving a second function to identify a value to be used to draw the image; and comparing the size of the given buffer to the value to determine whether to validate the request.

In one example, the method also includes, if value is within the size of the given buffer, validating the request. In another example, the method also includes, if the request is validated, using the first function to draw the image on a display device. In another example, the method also includes determining to not validate the request; and generating an error if the value is not within the size of the given buffer.

Another aspect of the invention provides a computer-implemented method of validating an attempt to draw an image using a graphics library including functions and elements. The method includes receiving a request from a user to use a first function to draw the image, the request identifying an index buffer including a set of index values; identifying a set of code to draw the image, the a set of code being associated with a set of inputs; identifying one or more buffers have been created; identifying a given buffer of the one or more buffers based on the set of inputs; identifying the size of the given buffer; scanning the index buffer to identify a highest index value; and comparing the size of the given buffer to the highest index value to determine whether to validate the request.

In one example, the method also includes, if the highest index value is within the size of the given buffer, validating the request. In another example, the method also includes, if the request is validated, using the first function to draw the image on a display device. In another example, the method also includes determining to not validate the request; and generating an error if the highest index value is not within the size of the given buffer. In another example, the method also includes associating the highest index value with the index buffer and storing the association in memory; receiving a second request from the user to use a first function to draw the image, the request identifying an index buffer including a second set of index values; identifying a second set of code to draw the image, the short program being associated with a set of inputs; identifying one or more second buffers have been created; identifying a given second buffer of the one or more second buffers based on the second set of inputs, the given second buffer; identifying the size of the given second buffer; and if a third function which is used to change the index buffer has not been called, selecting the highest index value from the stored association. In another example, the method also includes generating an error if the highest index value is not within the size of the given buffer. In another example, the method also includes comparing the size of the given second buffer to the selected highest index value to determine whether to validate the request. In another example, the method also includes if a third function which is used to change the index buffer has been called, scanning the index buffer to identify a new highest index value; and comparing the size of the given second buffer to the new highest index value to determine whether to validate the request.

Yet another aspect of the invention provides a computer. The computer includes memory storing a graphics library including functions and elements used to draw an image. The computer also includes a processor coupled to the memory. The processor is operable to receive a request from a user to use a first function from the graphics library to draw the image; identify a set of code to draw the image, the set of code being associated with a set of inputs; identify one or more buffers that have been created; identify a given buffer of the one or more buffers based on the set of inputs; identify the size of the given buffer; retrieve a second function from the graphics library to identify a value to be used to draw the image; and compare the size of the given buffer to the value to determine whether to validate the request.

In one example, the processor is also operable to, if the value is within the size of the given buffer, validating the request. In another example, the processor is also operable to, if the request is validated, using the first function to draw the image on a display device. In another example, the processor is also operable to determine to not validate the request; and generate an error if the value is not within the size of the given buffer.

Still a further aspect of the invention provides a computer. The computer includes memory storing a graphics library including functions and elements used to draw an image. The computer also includes a processor coupled to the memory. The processor is operable to receive a request from a user to use a first function to draw the image, the request identifying an index buffer including a set of index values; identify a set of code to draw the image, the a set of code being associated with a set of inputs; identify one or more buffers have been created; identify a given buffer of the one or more buffers based on the set of inputs; identify the size of the given buffer; scan the index buffer to identify a highest index value; and compare the size of the given buffer to the highest index value to determine whether to validate the request.

In one example, the processor is also operable to, if the highest index value is within the size of the given buffer, validate the request. In another example, the processor is also operable to, if the request is validated, use the first function to draw the image on a display device. In another example, the processor is also operable to determine to not validate the request; and generate an error if the highest index value is not within the size of the given buffer. In another example, the processor is also operable to associate the highest index value with the index buffer and storing the association in memory; receive a second request from the user to use a first function to draw the image, the request identifying an index buffer including a second set of index values; identify a second set of code to draw the image, the short program being associated with a set of inputs; identify one or more second buffers have been created; identify a given second buffer of the one or more second buffers based on the second set of inputs, the given second buffer; identify the size of the given second buffer; and if a third function which is used to change the index buffer has not been called, select the highest index value from the stored association. In another example, the processor is also operable to generate an error if the highest index value is not within the size of the given buffer. In another example, the processor is also operable to compare the size of the given second buffer to the selected highest index value to determine whether to validate the request. In another example, the processor is also operable to, if the selected highest index value is within the size of the second given buffer, validate the request. In another example, the processor is also operable to, if the request is validated, use the first function to draw the image on a display device. In another example, the processor is also operable to determine to not validate the request; and generate an error if the selected highest index value is not within the size of the second given buffer. In another example, the processor is also operable to if a third function which is used to change the index buffer has been called, scan the index buffer to identify a new highest index value; and compare the size of the given second buffer to the new highest index value to determine whether to validate the request.

BRIEF DESCRIPTION OF THE DRAWINGS

FIG. 7 is an exemplary flow diagram in accordance with an aspect of the invention.

DETAILED DESCRIPTION

Figure 1:
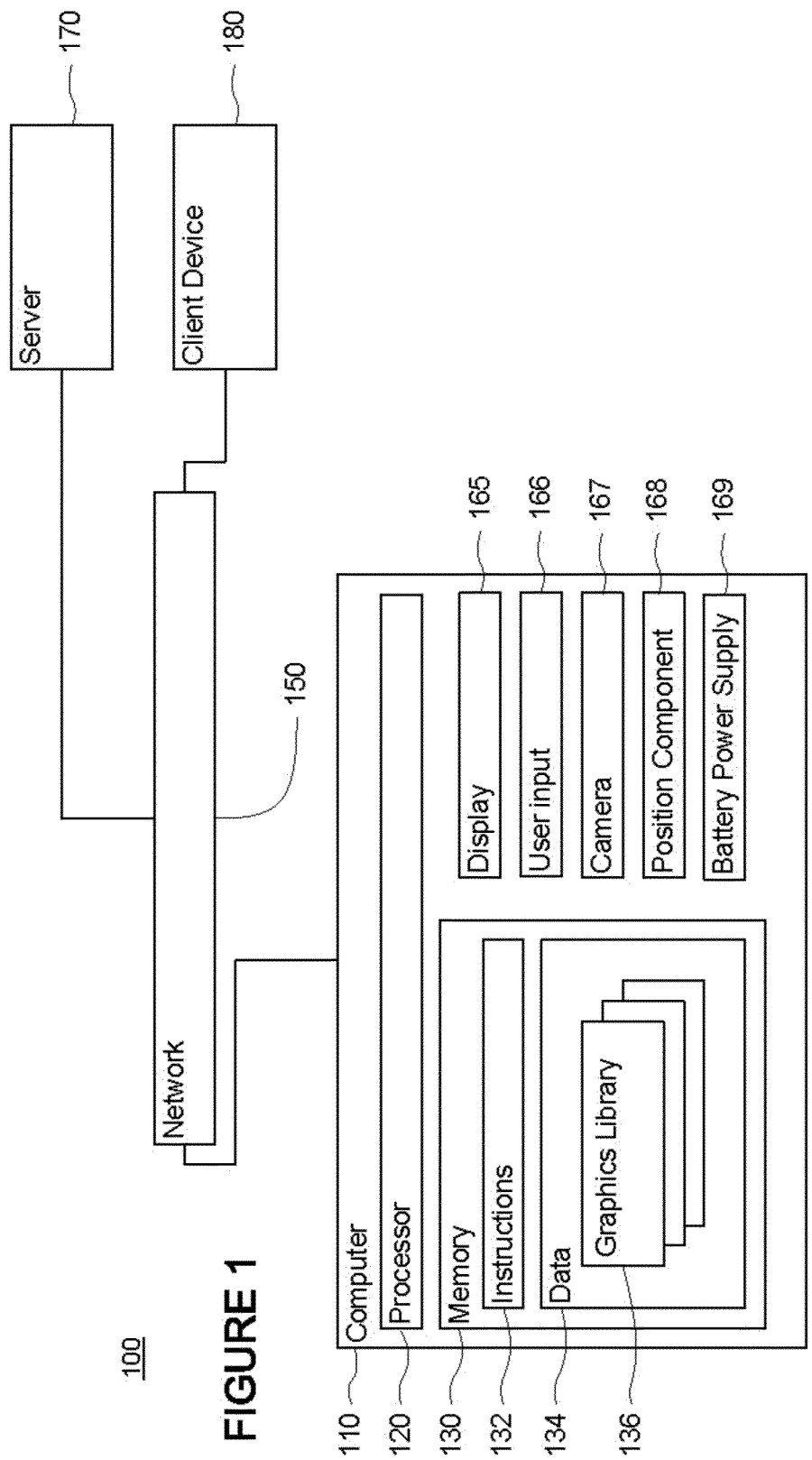
FIG. 1 is a functional diagram of a system in accordance with an aspect of the invention.

In one aspect of the invention, a user may use an emulator program to draw an image. The user may call a function which renders primitives from array data. In response, the emulator program may call a different version of this function and select a short program, called a shader, to draw defined by the user. Each of these short programs may identify inputs.

The emulator program identifies which short program is being used by calling a tracking function tracks functions that installs program objects as part of a current rendering state. In order to identify the inputs associated with the identified short program, the emulator may call a tracking function that tracks functions which link program objects. For each of the identified inputs, the emulator program may call a tracking function that tracks functions which enable or disable generic vertex attribute arrays in order to identify whether the attribute accesses an array or a constant.

The emulator may also call a tracking function that tracks functions which generate buffer object names in order to identify which buffers have been created. That tracks functions which define arrays of generic vertex attribute data to identify which of the created buffers may be used on the attributes. Here, the emulator program may call a tracking function that tracks functions to identify which of these created buffers is currently being used. In another example, the emulator program may call a tracking function which tracks functions that create and initialize a buffer object's data store in order to identify the size of the buffer currently being used. The emulator program may then use the different version of the function which renders primitives from array data to identify which values in the buffers currently being used may be used to complete the draw and whether these values are within the range of the buffer currently being used. If so, the real function that renders primitives from array data may be called to draw the image. Alternatively, if the values are not within the range of the buffer currently being used, an error may be generated.

In some examples, the function that renders primitives from array data may also require an index buffer. The index buffer may contain values or pointers to elements within other arrays and may be used to direct where the emulator should access the array information. If an index buffer is being used, when the function that renders primitives from array data is called, a different version of this function may be called. As described above, the various tracking functions may be called to identify the short programs, attributes, buffers, and size of the buffers or arrays used to draw the image. The index buffer may be scanned to identify the highest value in the buffer. This value is then compared to the size of the buffers or arrays which would be used to draw the image. If the highest value is within the buffer or array, the real function which renders the primitives using the index buffer may be called to draw the image. If the highest value is not within the buffer or array, an error may be generated.

Figure 2:
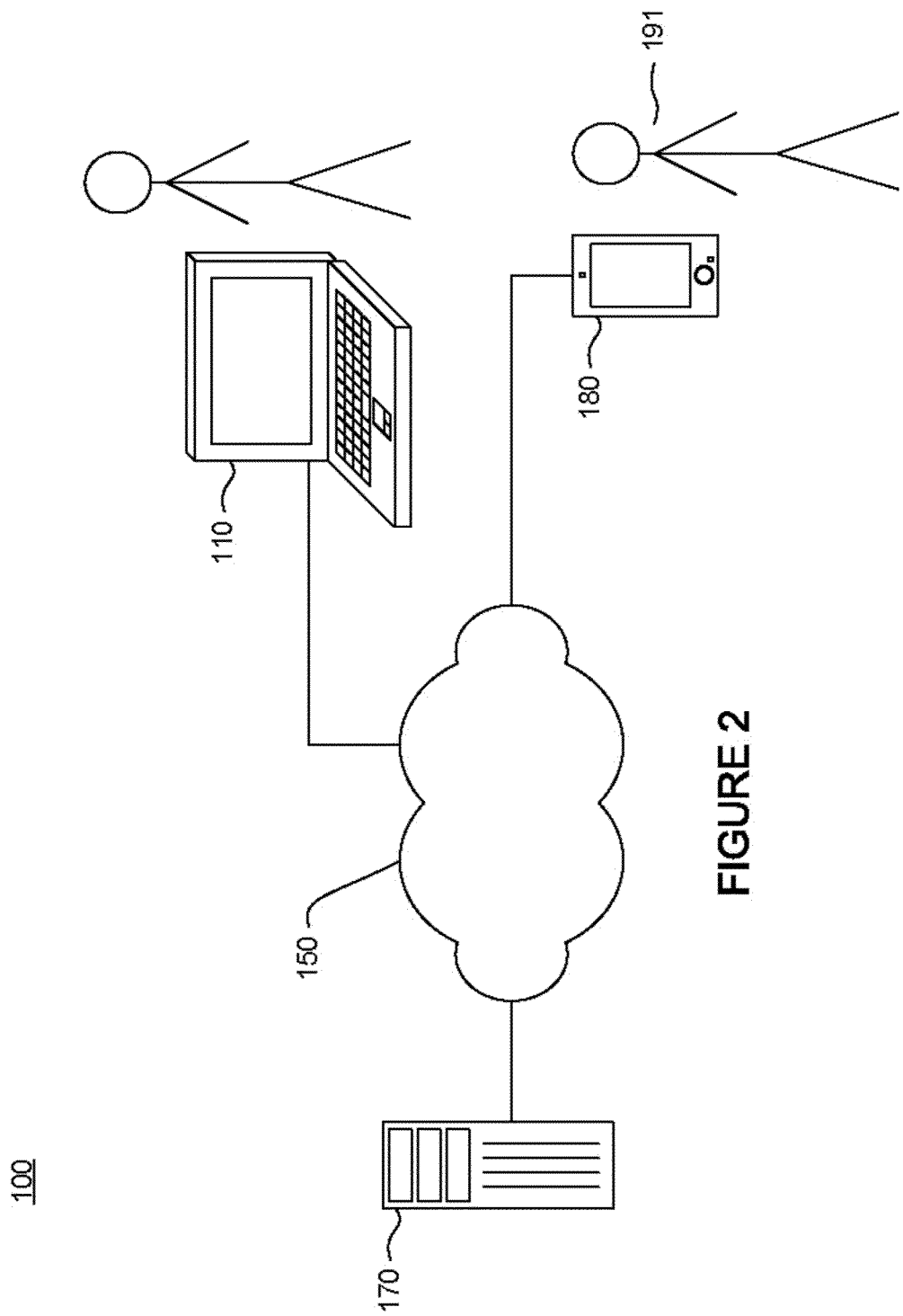
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it may be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer or memory may be understood to include references to a collection of processors or computers or memories that may or may not operate in parallel.

The computer 110 may be at one node of a network 150 and capable of directly and indirectly receiving data from other nodes of the network. Computer 110 may be a client device capable of sending and receiving information with other devices, such as client device 180 and server 170, on the network. The client device may send and receive information over the network and display information to a user on display 165. Computer 110 may also comprise a plurality of computers that exchange information with different nodes of a network for the purpose of receiving, processing and transmitting data.

Network 150, and intervening nodes between client 110 and other devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Computer 110 may be a personal computer intended for use by a person 191, and have all of the components normally used in connection with a personal computer such as an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although client device 110 may comprise a full-sized personal computer, it may alternatively comprise mobile devices capable of wirelessly exchanging data with a server over a network such as the Internet. By way of example only, client device 110 may be a wireless-enabled PDA, a cellular phone, netbook, or tablet PC capable of obtaining information via the Internet or other network. The user may input information using a small keyboard, a keypad, or a touch screen.

Data 134 may include a graphics library 136 of functions and elements used to draw graphics or images. For example, the graphics library may include the OpenGL and OpenGL ES libraries. This information may be used by a set of instructions, for example, an emulator, in order to allow a programmer to generate 2D or 3D graphics.

The graphics library may include various information such as buffer objects which may be used by client devices to allocate, initialize and render images from memory. Buffer objects may also be used to store vertex array and element index data. The library may also include functions which operate on buffer objects. For example, these functions may include functions that: allow a programmer to create or use a named buffer object (such as glBindBuffer), create and initialize a buffer object's data store (such as glBufferData), update a subset of a buffer object's data store (such as glBufferSubData); one or more functions which may delete named buffer objects (such as glDeleteBuffers), render primitives from array data (such as glDrawArrays or glDrawElements), enable or disable a generic vertex attribute array (such as glEnableVertexAttribArray), generate buffer object names (such as glGenBuffers), link a program object (such as glLinkProgram), install a program object as part of a current rendering state (such as glUseProgram), and may define an array of generic vertex attribute data (such as glVertexAttribPointer).

The library may also include secondary or different versions of the functions described above. For example, these different versions may be used to track and record when the "real" function is created, edited, used, etc. In some examples, the different versions may be "wrapped" versions of the real function. The wrapped versions may include a wrapper or set of code which operates on a function to determine how the function is executed.

Figure 9:
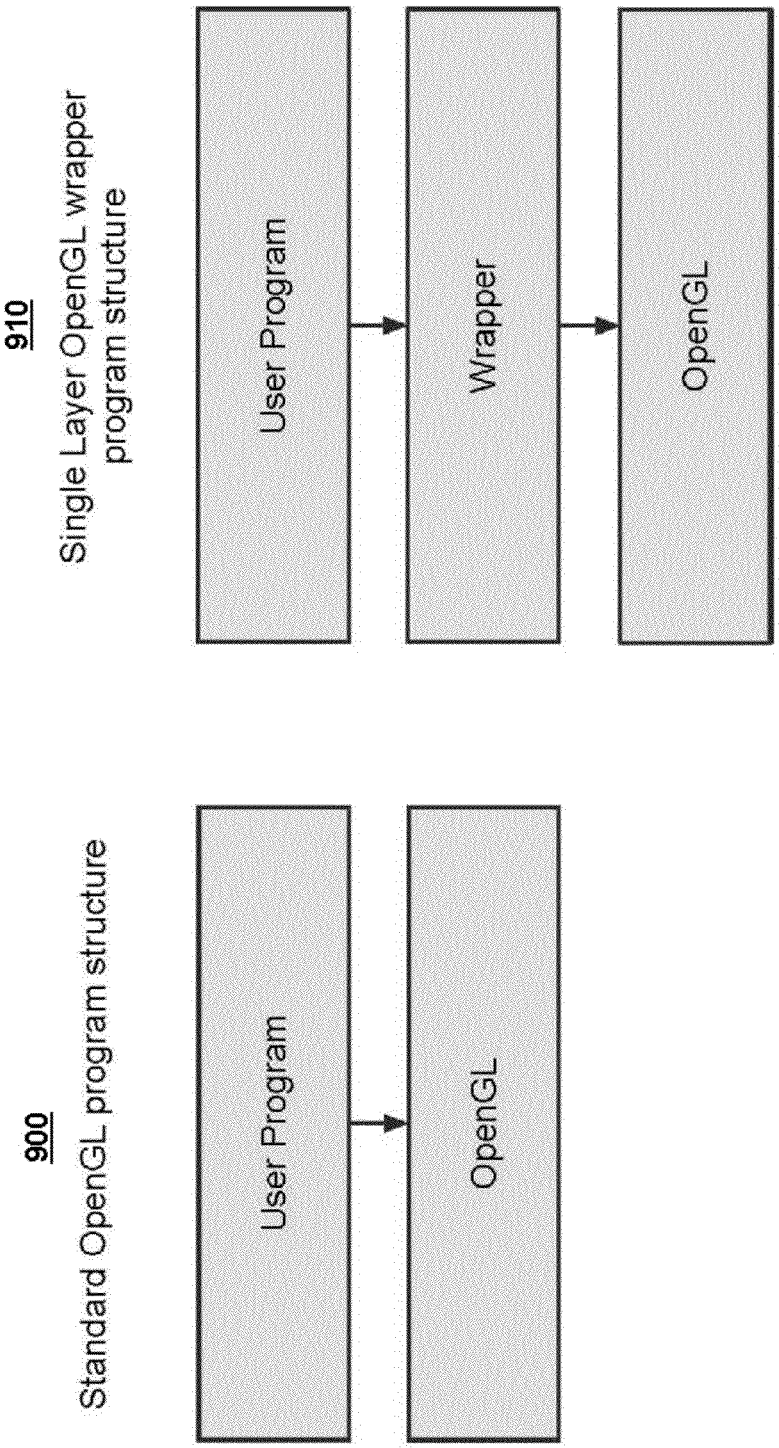
FIG. 9 is a diagram of an exemplary wrapper in accordance with an aspect of the invention.

The processor may use the wrappers to monitor the use of the functions and recall their various states. For example, the wrappers may include a single layer or may be multilayered (e.g., 3 or more layers). Diagram 900 of FIG. 9, shows that a standard OpenGL program structure includes the user program (which calls the functions) and OpenGL. The single layer wrapper of diagram 910 acts as an intermediary between the user program and OpenGL.

Figure 10:
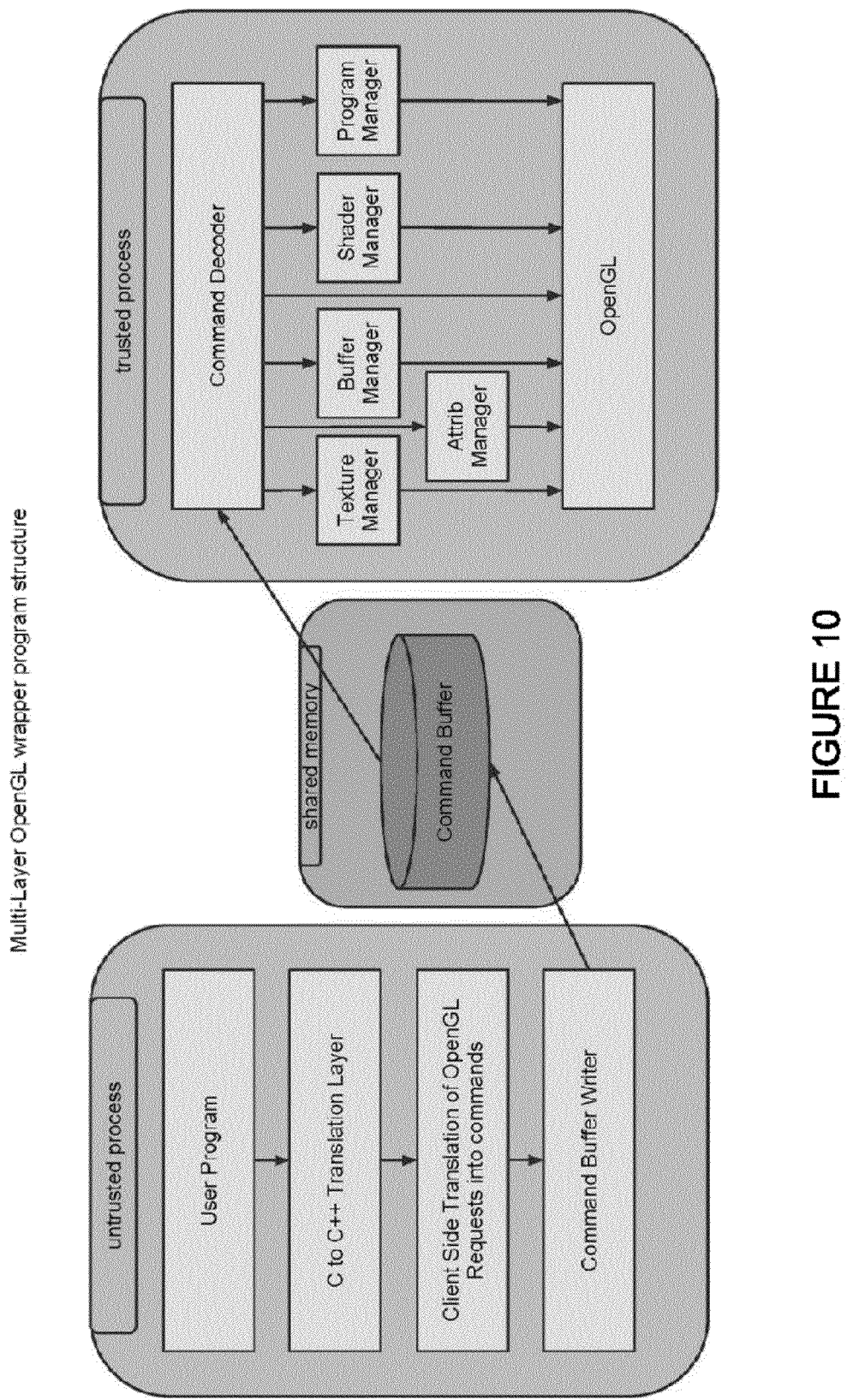
FIG. 10 is a diagram of an exemplary wrapper in accordance with an aspect of the invention.

In another example, shown in FIG. 10, the wrapper may have multiple layers. The first level may include the OpenGL ES 2.0 file that defines the OpenGL ES 2.0 functions (the "official file"). Minor modifications to this file may allow the emulator to change the calls for the OpenGL ES functions to the calls for the wrappers themselves. In one example, a user program may call the function "glBindBuffer," which allows a programmer to create or use a named buffer object. In response, the official file may actually call the glBindBuffer wrapper. This may be the second layer of the wrapper. The functions in this second layer of the wrapper may translate from C to C++ and call the third layer of the wrapper. The third layer then uses the C++ to instruct the fourth layer of the wrapper to write commands to memory using a set of low level features. In some examples, these low level features may be defined in about 50 different files. The commands may be read out of the fifth layer. The fifth layer then calls the real OpenGL ES function, here glBindBuffer, to complete some action. This fifth layer may also utilize a set of classes to assist it in recording values.

Various wrapping techniques may be used so long as the emulator is able to perform the operations described herein with regard to each particular function type.

As described in more detail below, various files may be used to store information about arrays or buffers as well as programs used to draw images called shaders.

Various operations in accordance with aspects of the invention may now be described. It should also be understood that the following operations do not have to be performed in the precise order described below. Rather, various steps can be handled in a different order or simultaneously, and steps may be added or removed.

A user (here, a programmer) may uses the API to draw 3D graphics. For example, the user may write a set of code for drawing a 2D or 3D image using an emulator program which, upon request, may draw the image and provide feedback to the user regarding the data written by the user. This data may include positions, colors, textures, etc.

Figure 3:
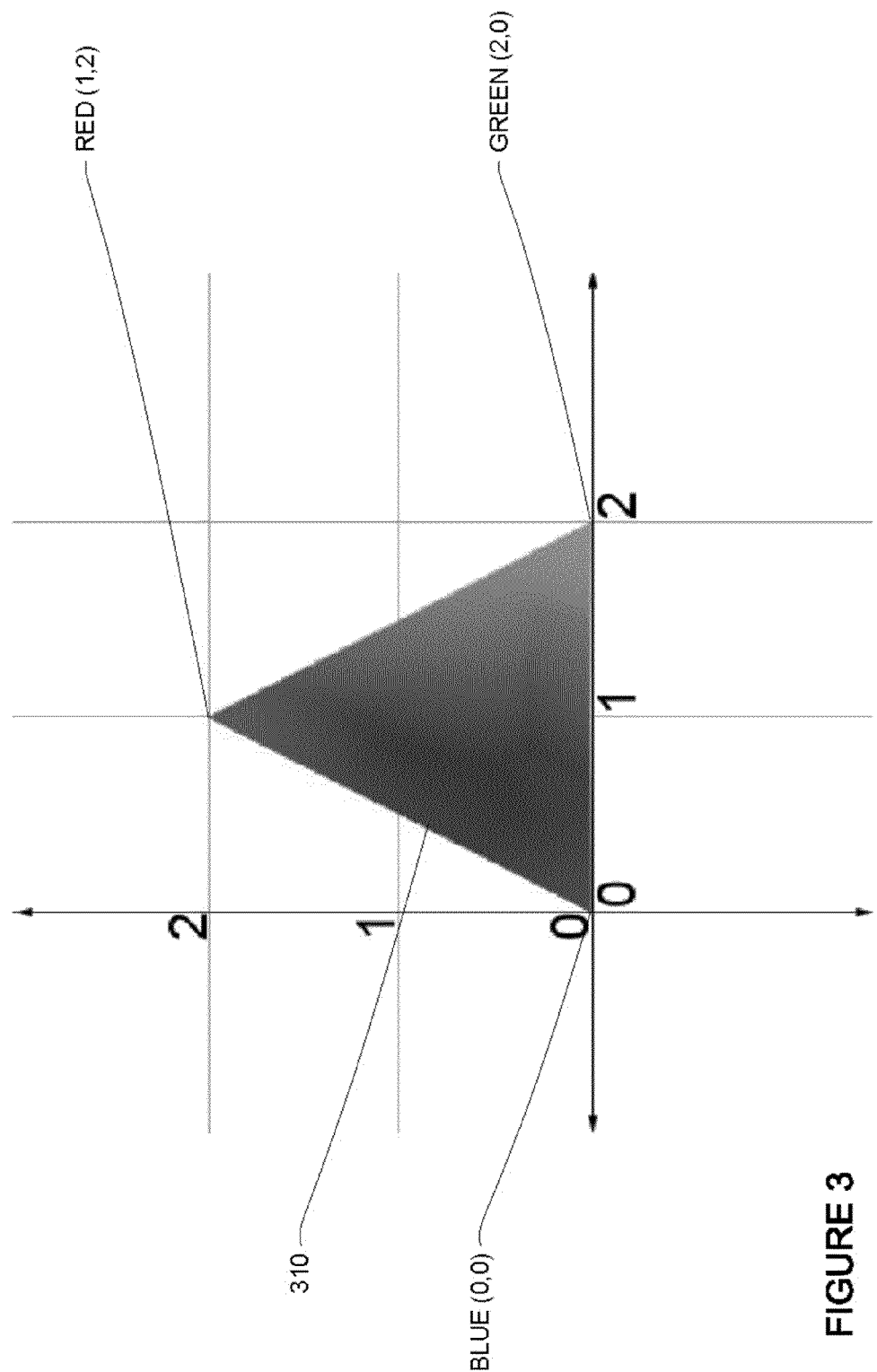
FIG. 3 is an exemplary graphic in accordance with an aspect of the invention.

For example, triangle 310 depicted in FIG. 3 includes three vertices, a red vertex at (1,2), a blue vertex at (0,0), and a green vertex at (0,2). This image may be drawn by using two arrays: a position array [(0,0),(1,2),(2,0)] and a color array [blue,red, green]. These arrays may also be called "buffers," for example, when used with the functions described herein. The image may be drawn by calling a function which renders primitives from the array data. In one example, the function may be glDrawArrays that renders primitives from array data. In this case, the user must designate the number of pieces of data to be accessed to render the image. For example, in OpenGl, the user may select the primitive to be drawn as a triangle using gl_TRIANGLES. The user may also designate the starting element (staringElement) as 0 and the number of elements (numberofElements) to be drawn as 3. Accordingly, the call may be written as: glDrawArrays(GL TRIANGLES, startingElement, numberOfElements).

In order to prevent the security breaches described above, the emulator may generate errors when the user requests a function to access data outside of an array when drawing an image. This may be accomplished, for example, by using a wrapper to monitor and track the use of functions which access the arrays (or buffers) and use them to draw the image. For example, the function glDrawArrays may be wrapped. When this function is requested, the emulator may retrieve the wrapped version of the function. Before drawing the image, the processor may use the wrapper to determine whether the values, here startingElement and numberofElements, would access information outside of the actual arrays.

If so, the emulator program may return an error. It may also require the user to fix the problem before continuing the draw. For example, returning to the example of FIG. 3 above, if the user sets the value of numberOfElements to 4, this is greater than the number of elements in the position and color buffers. Thus, OpenGL may access data past the end of the buffers. In another example, a computer may begin counting at 0 (as opposed to 1), and the startingElement may be the distance from the start of the array that the computer has to skip in order to start drawing. If the computer is to begin at the start of an array, the computer must skip 0 (or nothing), and if the computer is to begin at the second element of the array, the computer must skip 1 element, etc. Therefore, if the user sets the value of startingElement to a value greater than 0, then OpenGL may again access data past the end of the buffer. Accordingly, even though there is no actual error in either the OpenGL or OpenGL ES systems, the emulator may generate an error message. The user may check for any generated errors and choose to respond as he or she sees fit, for example, by making changes, etc.

If the values are within the bounds of the arrays, the processor may use the wrapper to call the real or actual function, in this example glDrawArrays, to draw the image.

In response, the user may be required to correct the error in order to complete the draw. For example, if the error indicates that a value is out of range, the user may query the glDrawArrays function. Again, the emulator may instead call the glDrawArrays wrapper. The wrapper may return the queried values or alternatively, call the actual glDrawArrays to return the values. The user may then replace any values. Thus, the next time the glDrawArrays function is called, the processor may use the wrapper to determine that the values are within the range and call the real glDrawArrays function to complete the draw.

The emulator may request information about the buffers by calling OpenGL and querying the values. This process may be extremely slow as the emulator may have to wait for other processes to finish before being able to access the information. In addition, although a value may be stored within a buffer, if the value has been updated or changed, the emulator may not even be able to retrieve the information by calling the function itself. This may be especially true with regard to functions which may create and initialize a buffer object's data store, for example, in the case of the function glBufferData.

In order to speed up the process of verifying these values, additional wrappers may be used. For example, as discussed above, functions which may create and initialize a buffer object's data store, for example, glBufferData, may be wrapped in order to record the values in the buffer (or array). In one case, if a user requests glBufferData, the emulator may call this function. If the call is successful, then the buffer may be whatever size the user has requested and the wrapper may be used to record the size of the buffer as well as its contents. If the call to glBufferData was unsuccessful, for example, where the buffer has run out of memory or the user attempts to pass the buffer invalid parameters, the buffer may remains it was before the user called glBufferData. Thus, the wrapper need not record any changes.

Some additional functions may be wrapped to increase the speed with which information is retrieved or identified. For example, functions which allow a user to create or use a named buffer object and those which may delete named buffer objects, such as glBindBuffer and glDeleteBuffers, may be wrapped in order to identify when and which buffers are created or deleted. Functions which allow a user to create or use a named buffer object, such as glBindBuffer, may be wrapped in order to identify which buffer is currently being used. Other functions which may enable or disable a generic vertex attribute array, such as glEnableVertexAttribArray or glDisableVertexAttribArray, may be wrapped in order to record whether each attribute (or set of possible inputs to a shader program) may access an array or a constant value. For example, if the attribute is using a constant value, the attribute would not require bounds checking because there may be no array to check. Functions which define an array of generic vertex attribute data, such as glVertexAttribPointer, may be wrapped to identify which buffers may be used on which attributes.

Each function may be wrapped with its own specific wrapper. The wrappers themselves may include the same features as the wrapped function, but may allow the processor to call and identify values faster as the actual functions themselves, which may be in use by other processes, may not need to be called. In this case, the emulator program may not need to wait to identify the values until the functions are not in use. Thus, the emulator program may operate much more efficiently when the additional wrappers are utilized.

Using the wrappers may provide information on buffers. However, in order to identify which buffers may be used, the emulator program may run short programs to assist with drawing an image. For example, OpenGL uses these short programs or "shaders" which are defined by the user. Each shader may identify input values called "attributes." In order to identify when these tracking programs are being used, functions which link a program object, such as glLinkProgram, may be wrapped. These types of functions may determine whether two shader programs may operate together. If a link is successful, the shader may be queried to identify the attribute inputs and this information may be stored by the wrapper. Only after a link is successful can the shader be queried.

Which tracker program is in use may be determined by wrapping functions which install program objects as part of a current rendering state. For example, the glUseProgram function may be wrapped in order to identify which shader program is currently in use.

The wrapping described above may allow the emulator program to identify which tracking program is being used and which attributes are actually being used by that tracking program. In addition, for those attributes that are being used, the emulator may identify which buffer they use and what parts may be accessed. Accordingly, the emulator program may generate an error if that access is outside of the range of the buffer.

Figure 4:
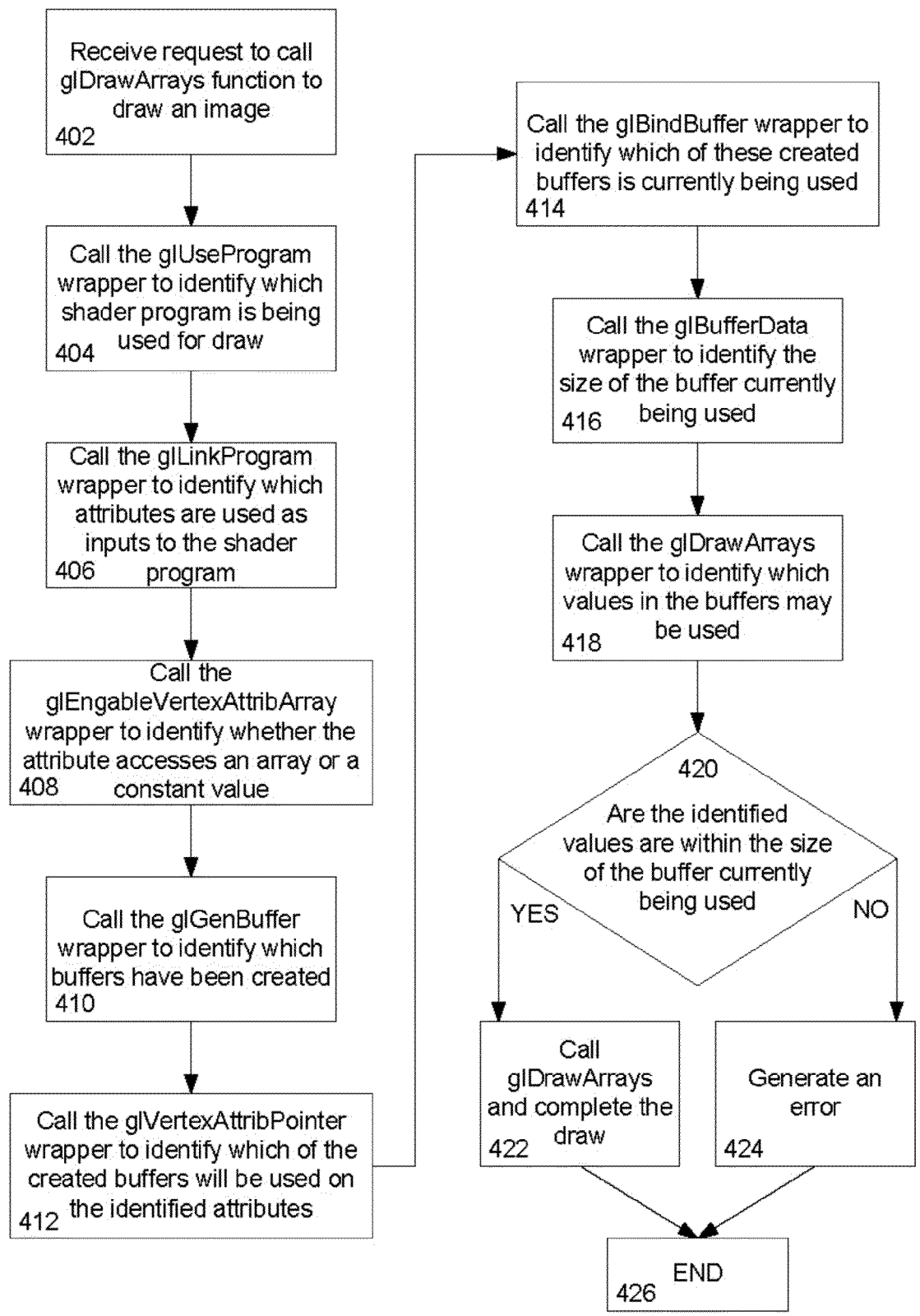
FIG. 4 is an exemplary flow diagram in accordance with an aspect of the invention.

For example, as shown in block 402 of FIG. 4, he emulator receives a request to call the function glDrawArrays to draw an image. The program calls the glUseProgram wrapper to identify which shader program is being used for draw at block 404. The program calls the glLinkProgram wrapper to identify which attributes are used as inputs to the shader program at block 406. For each of these identified attributes, the program calls the glEnableVertexAttribArray wrapper to identify whether the attribute accesses an array or a constant value at block 408. Again, if the attribute is using a constant value, the attribute would not require bounds checking because there may be no array to check. The program calls the glGenBuffer wrapper to identify which buffers have been created at block 410. The program calls the glVertexAttribPointer wrapper to identify which of the created buffers will be used on the identified attributes at block 412. The program calls the glBindBuffer wrapper to identify which of these created buffers is currently being used at block 414. The program calls the glBufferData wrapper to identify the size of the buffers currently being used at block 416. At block 418, the emulator program calls the glDrawArrays wrapper to identify which values in the currently used buffers may be used and whether they are within the size of the buffer currently being used. At block 420, the program determines whether the identified values are within the size of the buffer currently being used. If so, the real glDrawArrays is called to draw the image at block 422, and the process ends at block 426. Alternatively, if the values are not within the range of the buffer currently being used, an error is generated at block 424, and the process ends at block 426.

Figure 5A:
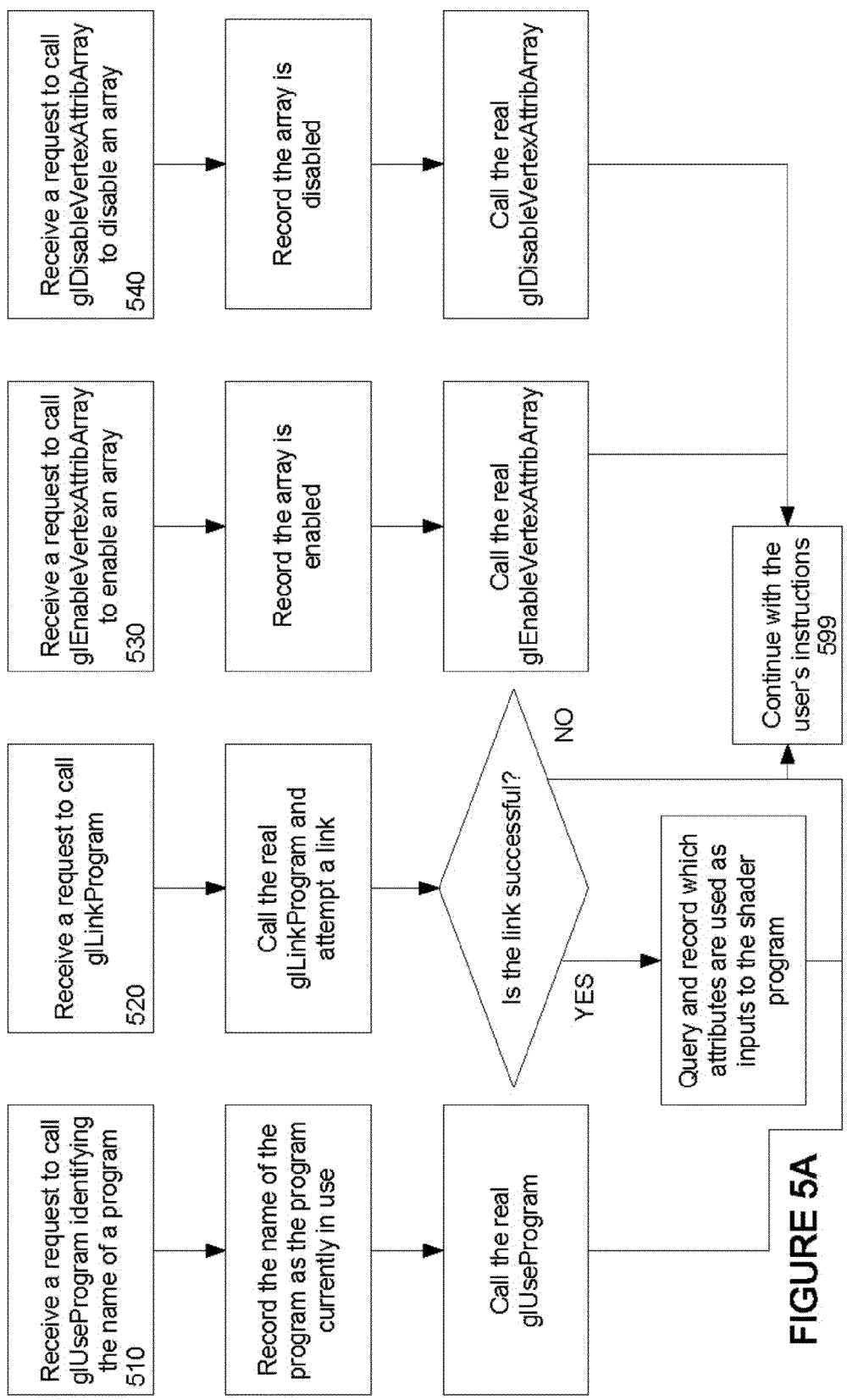
FIGS. 5A-5C are an exemplary flow diagram in accordance with an aspect of the invention.
Figure 5B:
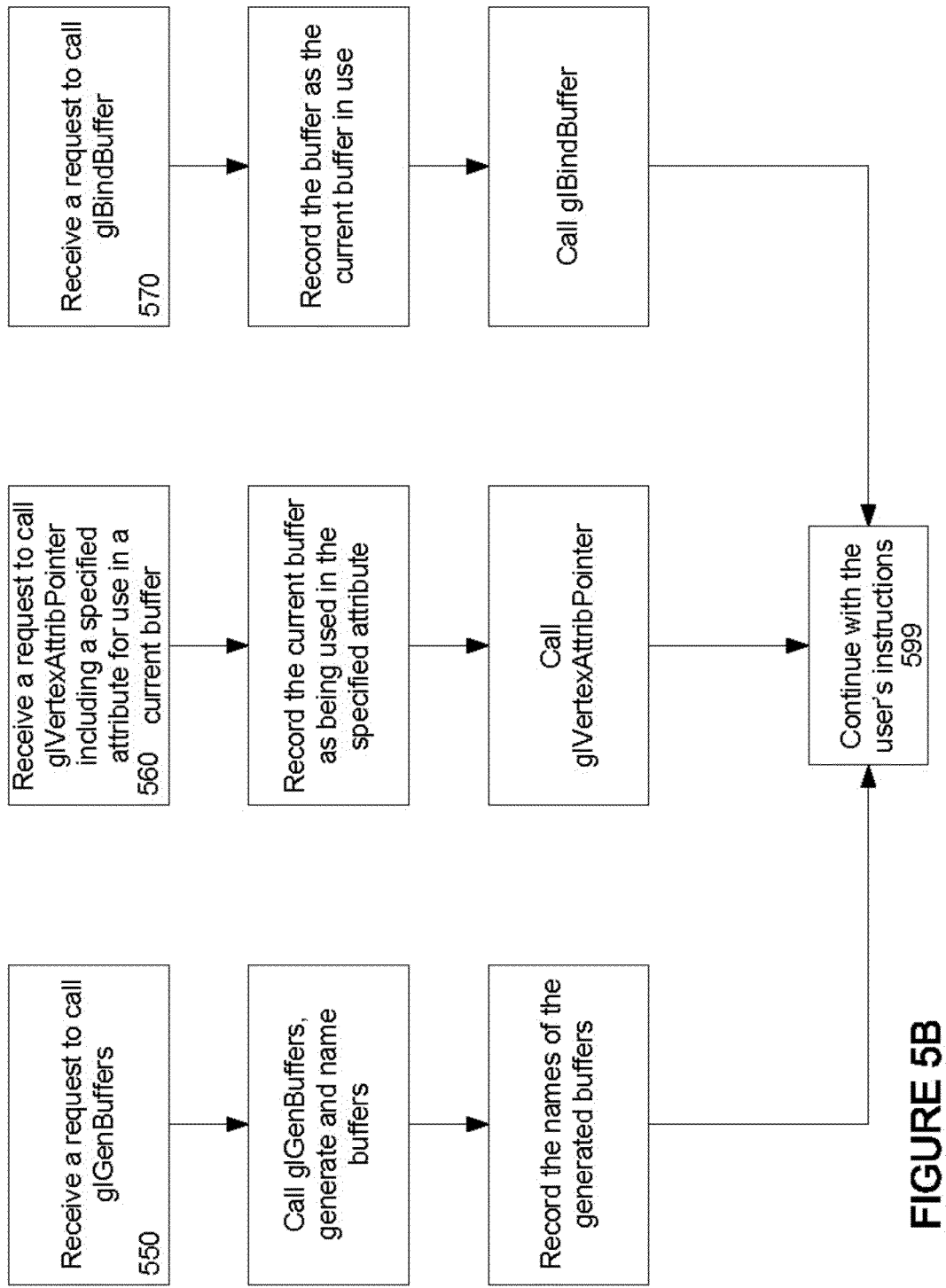
Figure 5C:
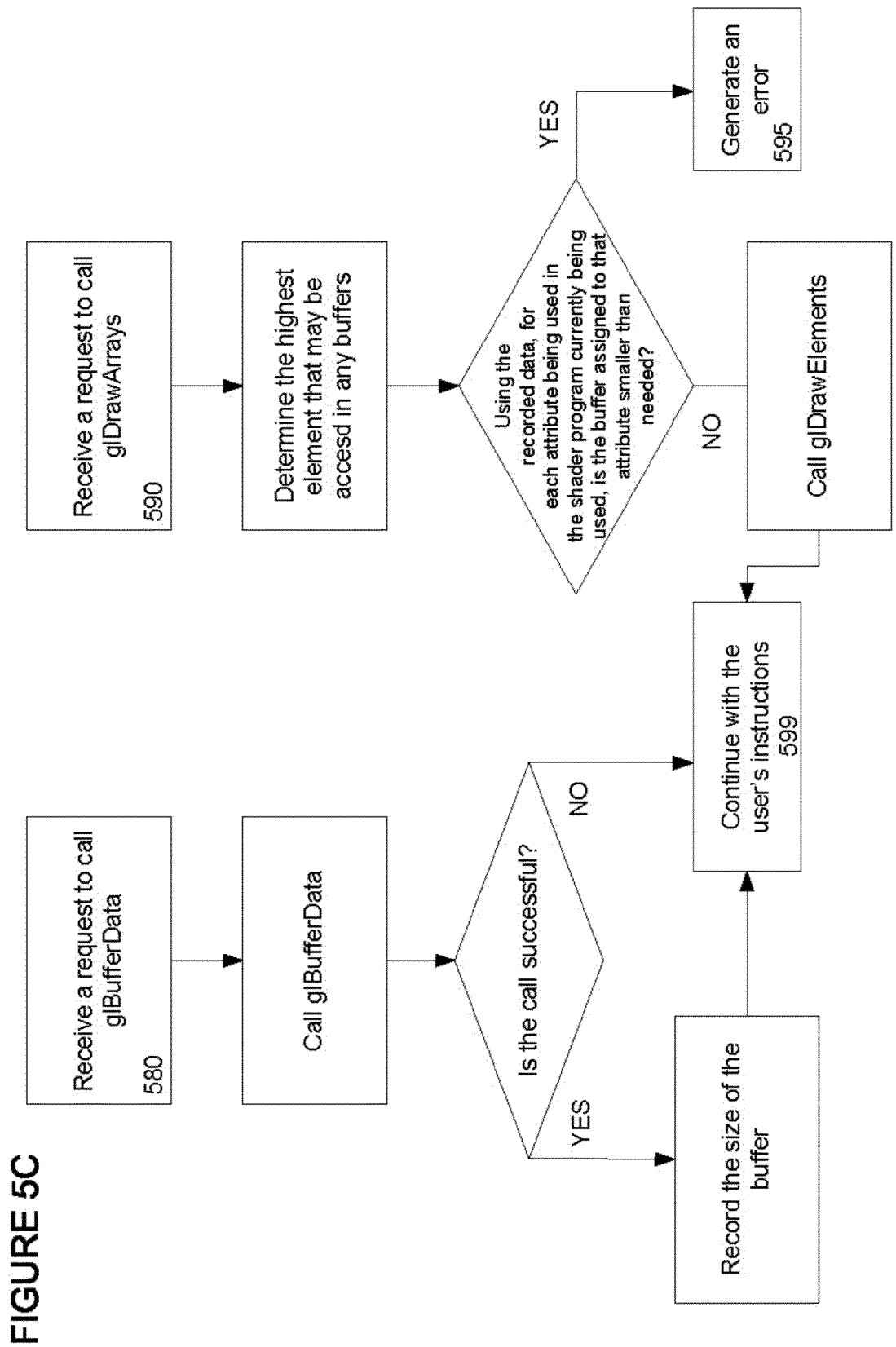

It will be understood that many of the steps shown in FIG. 4 and described above may actually be the result of actions taken by a user. In other words, the steps above may be performed in any order and may also operate in parallel. For example, the wrapped version of a function may be called whenever the user requests the emulator to call the actual program. The information supplied by the user is then recorded. For example, as shown in FIGS. 5A-5C, the user may request any of the functions at blocks 510, 520, 530, 540, 550, 560, 570, 580, or 590. As shown in FIGS. 5A-5C, depending upon the function which the user requests, different steps may be taken as described above. With regard to calls for the functions of blocks 510, 520, 530, 540, 550, 560, 570, and 580, once the pertinent information has been recorded and the real version of the function called (as opposed to a wrapped version), the emulator may continue with the user's instructions at block 599. When the emulator receives a request to call glDrawArrays at block 590, the recorded information may be used as described above, and the emulator may either generate an error at block 595 or continue with the user's instructions at block 599.

Some functions which render images from array data may access the arrays indirectly, for example, by calling a second buffer. For example, glDrawElements may access a second buffer called an "index buffer" that contains pointers to elements within other arrays. These pointers may be used to direct where the emulator should access the array information, as opposed to simply providing the arrays themselves.

Returning to the example of FIG. 3 above, the index buffer may be: IndexBuffer: [0,1,2]. The same triangle may also be drawn by using the same elements in a different order: Index- Buffer: [2,0,1]. In this example, the index buffer may specify the values of the arrays and the order in which to use the values. For example, [2,0,1] may refer to [green,blue,red] or [(2,0),(0,0),(1,2)].

In order to determine whether the values within the index buffer are within the range of the arrays themselves, additional functions may be wrapped. For example, the function utilizing the index buffer, here glDrawElements, may be wrapped. In this example, when glDrawElements is called, the emulator may actually call the glDrawElements wrapper.

This wrapper may be used determine whether the range requested in the index buffer is valid. For example, this wrapper may identify which values in the index buffer may be used. For example, the user may specify parameters to glDrawElements. These parameters may include, for example, mode, count, type, and indices. The indices may specify the start of a range as an array or an offset into a buffer. The count may specify the size of the range. The specified range of the index buffer may be scanned to identify the highest index value. Using this highest index value, the emulator may determine whether this value is within the range of the arrays identified for the draw. If not, the emulator may generate an error. Again, the user may check for any generated errors and choose to respond as he or she sees fit, for example, by making changes, etc. If so, the emulator may continue with the draw and call the real glDrawElements.

Returning to the example of FIG. 3, if the index buffer is "indexBuffer: [0,1000,2]," the highest value would be 1000. This highest value is greater than the number of entries in either the position or color arrays. Accordingly, the emulator program would generate an error.

Scanning the index buffer may be a very slow operation. In some examples, this scanning may be avoided to shorten the process. For example, functions which create and initialize a buffer object's data store, such as glBufferData, and functions which update a subset of a buffer object's data store, such as glBufferSubData, may be wrapped in order to identify the contents of the index buffer.

For example, when called, the function glDrawElements is passed a count and an offset into an index buffer. For each index buffer, after the specified range is scanned, the count, offset, and the highest index value may be associated with the index buffer and the association stored in memory for later use. The next time the emulator is asked to draw an image, the emulator may determine, for example by querying the wrappers for glBufferData and glSubBufferData, whether these functions have been called since the last draw and whether the contents of the index buffer have changed.

For example, each time the functions BufferData and SubBufferData are called, the wrappers may delete all prior associations. When glDrawElements has been called and the count, offset and index buffer have been specified, the memory may be checked for any relevant associations. If the buffer contents have changed, or rather if BufferData and SubBufferData have been called, no associations will exist and the index buffer may be scanned to identify the highest index value as described above. If a relevant association (or one with the same count, offset, and index buffer combination) exists, the emulator may reference the saved data to identify the highest value and avoid having to rescan the index buffer.

Figure 6A:
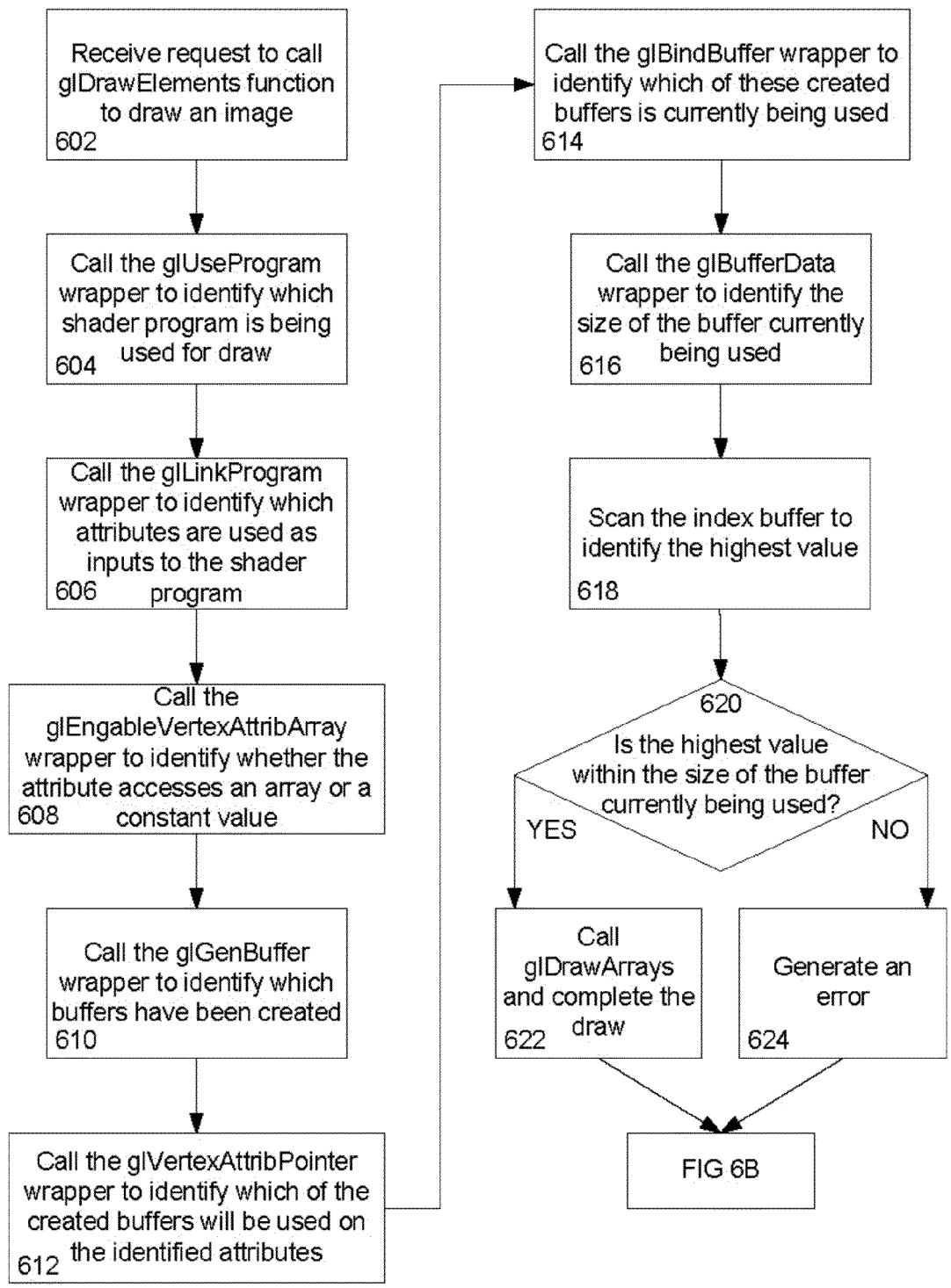
FIGS. 6A and 6B are an exemplary flow diagram in accordance with an aspect of the invention.

For example, as shown in block 602 of FIG. 6A, the emulator receives a request to call the function glDrawElements to draw an image. The program calls the glUseProgram wrapper to identify which shader program is being used for draw at block 604. The program calls the glLinkProgram wrapper to identify which attributes are used as inputs to the shader program at block 606. For each of these identified attributes, the program calls the glEnableVertexAttribArray wrapper to identify whether the attribute accesses an array or a constant value at block 608. Again, if the attribute is using a constant value, the attribute would not require bounds checking because there may be no array to check. The program calls the glGenBuffer wrapper to identify which buffers have been created at block 610. The program calls the glVertexAttribPointer wrapper to identify which of the created buffers will be used on the identified attributes at block 612. The program calls the glBindBuffer wrapper to identify which of these created buffers is currently being used at block 614. The program calls the glBufferData wrapper to identify the size of the buffers currently being used at block 616. At block 618, the index buffer is scanned to identify the highest value.

At block 620, the program determines whether the highest value is within the size of the buffer currently being used. If so, the real glDrawElements is called to draw the image at block 622. Alternatively, if the values are not within the range of the buffer currently being used, an error is generated at block 624. In some cases, the process continues in FIG. 6B.

Figure 6B:
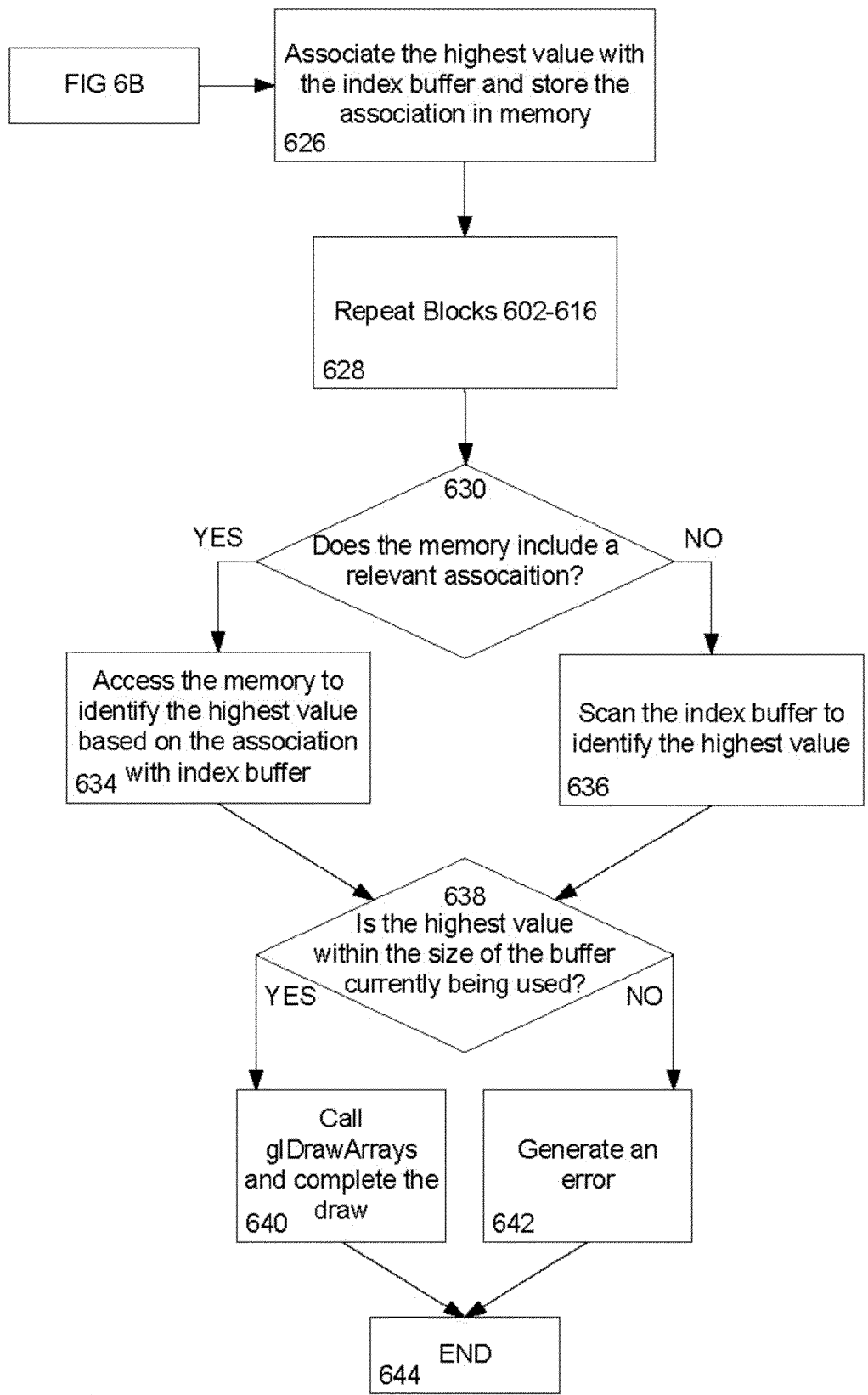

Turning to block 626 of FIG. 6B, the highest value is associated with the index buffer. This association is stored in memory for later use. When the user submits a new request to draw an image, for example, by calling glDrawElements again, as shown in block 628, the process repeats blocks 602 through 616. Rather than moving to block 620, the memory may be examined to identify whether a relevant association has been stored. As shown in block 632, the program may access the memory to identify the highest value based on index buffer. Then, at block 636, the program determines whether the highest value is within the size of the buffer currently being used. If so, the real glDrawElements is called to draw the image at block 638, and the process ends at block 642. Alternatively, if the values are not within the range of the buffer currently being used, an error is generated at block 640, and the process ends at block 642.

If no relevant association is identified at block 632, the program may scan the index buffer to identify the highest value as shown in block 634. The process then continues at block 636 as described above.

As with the steps of FIG. 4, the steps shown in FIG. 6A and described above may actually be the result of actions taken by a user. Again, these steps may not necessarily be performed in any particular order. For example, the wrapped version of a function may be called whenever the user requests the emulator to call the actual program. The information supplied by the user is then recorded. For example, as shown in FIGS. 5A-5B and 7, the user may request any of the functions at blocks 510, 520, 530, 540, 550, 560, 710, 720, or 790. Again, depending upon the function which the user requests, different steps may be taken as described above. With regard to calls for the functions of blocks 510, 520, 530, 540, 550, 560, 570, 710 and 720, once the pertinent information has been recorded and the real version of the function called (as opposed to a wrapped version), the emulator may continue with the user's instructions at block 599. When the emulator receives a request to call glDrawElements at block 790, the recorded information may be used as described above, and the emulator may either generate an error at block 795 or continue with the user's instructions at block 599.

Figure 8:
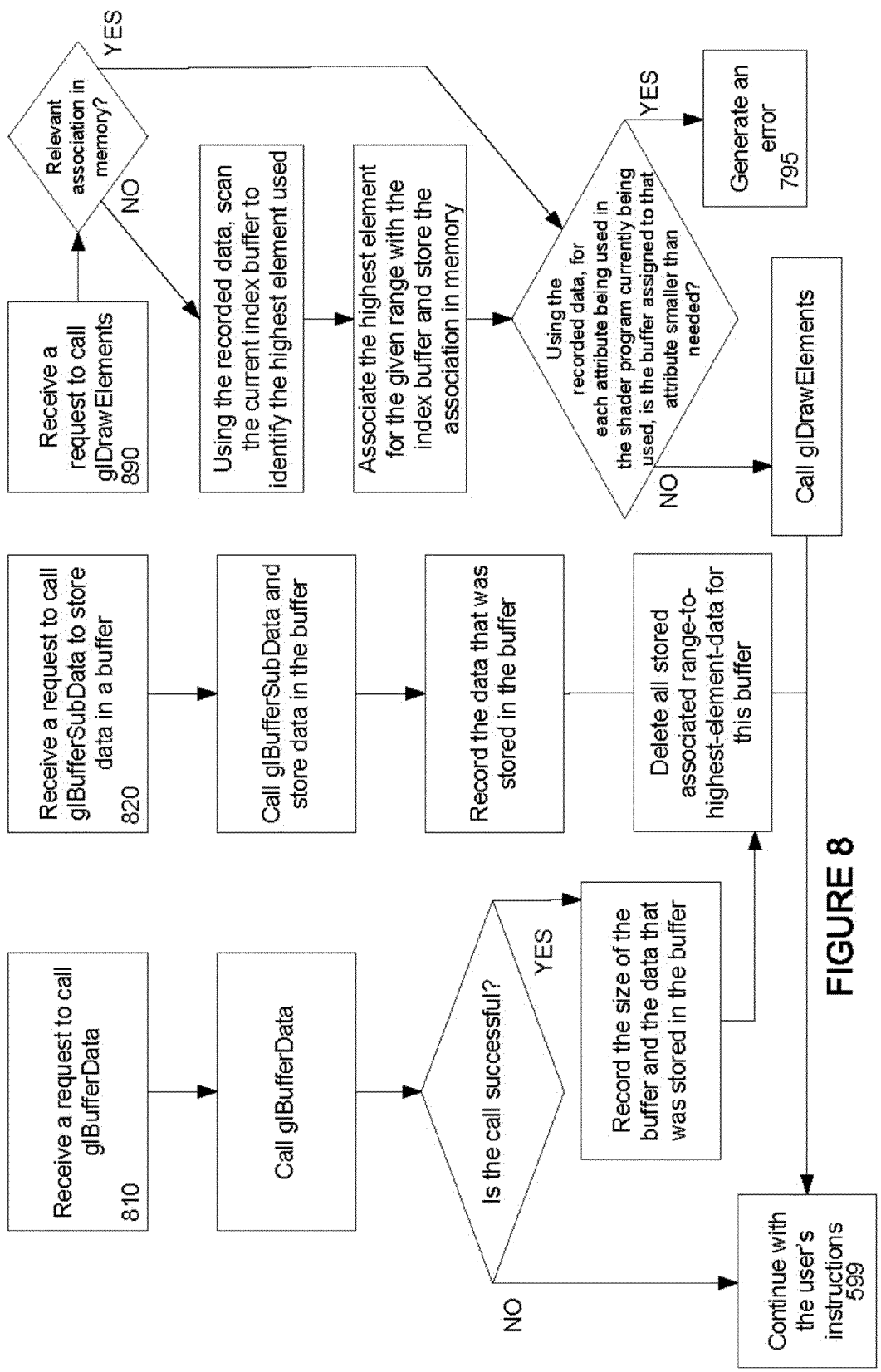
FIG. 8 is an exemplary flow diagram in accordance with an aspect of the invention.

Similarly, as depicted in FIG. 8, the steps shown in FIG. 6B and described above may not necessarily be performed in any particular order and may be the result of actions by the user. For example, as shown in FIGS. 5A-5B and 8, the user may request any of the functions at blocks 510, 520, 530, 540, 550, 560, 810, 820, or 890. Again, depending upon the function which the user requests, different steps may be taken as described above. With regard to calls for the functions of blocks 510, 520, 530, 540, 550, 560, 570, 810 and 820, once the pertinent information has been recorded and the real version of the function called (as opposed to a wrapped version), the emulator may continue with the user's instructions at block 599. When the emulator receives a request to call glDrawElements at block 890, the recorded information may be used as described above, and the emulator may either generate an error at block 895 or continue with the user's instructions at block 599.

As these and other variations and combinations of the features discussed above can be utilized without departing from the invention as defined by the claims, the foregoing description of exemplary embodiments should be taken by way of illustration rather than by way of limitation of the invention as defined by the claims. It may also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method of validating an attempt to draw an image using a graphics library including functions and elements, the method comprising:
   receiving a request from a user to use a first function to draw the image;
   identifying, by a processor, a set of code to draw the image, the set of code being associated with a set of inputs;
   identifying one or more buffers that have been created;
   identifying a given buffer of the one or more buffers based on the set of inputs;
   identifying a size of the given buffer;
   retrieving a second function to identify a value to be used to draw the image; and
   comparing the size of the given buffer to the value to determine whether to validate the request.

2. The method of claim 1, further comprising when the value is within the size of the given buffer, validating the request.

3. The method of claim 2, further comprising when the request is validated, using the first function to draw the image on a display device.

4. The method of claim 1,
   further comprising:
   determining to not validate the request; and
   generating an error when the value is not within the size of the given buffer.

5. A computer comprising:
   memory storing a graphics library including functions and elements used to draw an image;
   a processor coupled to the memory, the processor being operable to:
   receive a request from a user to use a first function from the graphics library to draw the image;
   identify a set of code to draw the image, the set of code being associated with a set of inputs;
   identify one or more buffers that have been created;
   identify a given buffer of the one or more buffers based on the set of inputs;
   identify a size of the given buffer;
   retrieve a second function from the graphics library to identify a value to be used to draw the image; and
   compare the size of the given buffer to the value to determine whether to validate the request.

6. The computer of claim 5, wherein the processor is further operable to, when the value is within the size of the given buffer, validating the request.

7. The computer of claim 6, wherein the processor is further operable to, when the request is validated, using the first function to draw the image on a display device.

8. The computer of claim 5, wherein the processor is further operable to:
   determine to not validate the request; and
   generate an error when the value is not within the size of the given buffer.

9. A non-transitory, tangible computer-readable storage medium on which computer readable instructions of a program are stored, the instructions, when executed by a processor, cause the processor to perform a method of validating an attempt to draw an image using a graphics library including functions and elements, the method comprising:
   receiving a request from a user to use a first function to draw the image;
   identifying a set of code to draw the image, the set of code being associated with a set of inputs;
   identifying one or more buffers that have been created;
   identifying a given buffer of the one or more buffers based on the set of inputs;
   identifying a size of the given buffer;
   retrieving a second function to identify a value to be used to draw the image; and
   comparing the size of the given buffer to the value to determine whether to validate the request.

10. The medium of claim 9, wherein the method further comprises when the value is within the size of the given buffer, validating the request.

11. The medium of claim 10, wherein the method further comprises when the request is validated, using the first function to draw the image on a display device.

12. The medium of claim 9, wherein the method further comprises:
    determining to not validate the request; and
    generating an error when the value is not within the size of the given buffer.

* * * * *